June 21, 1955　　　S. M. SHONE ET AL　　　2,711,328
FOLDING BABY STROLLER
Filed June 12, 1952　　　　　　　　　　　　　　4 Sheets-Sheet 3
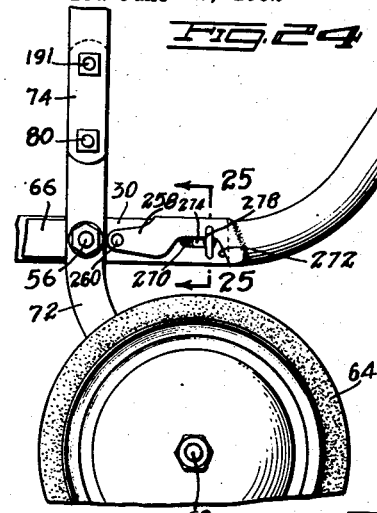
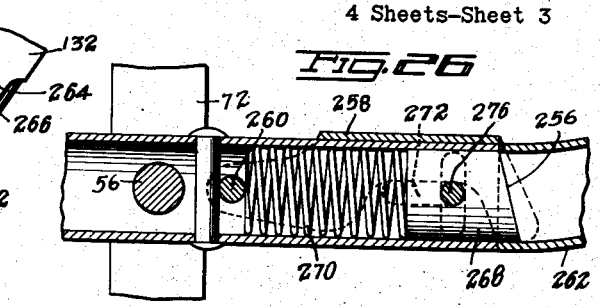
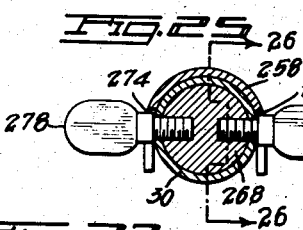
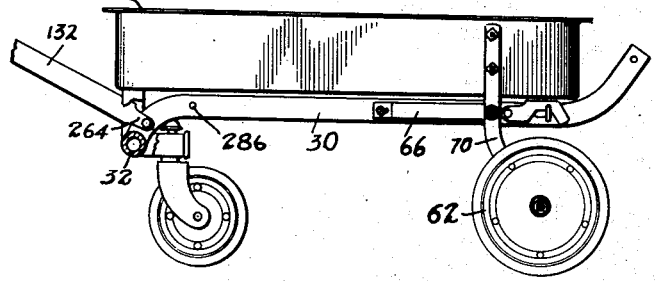
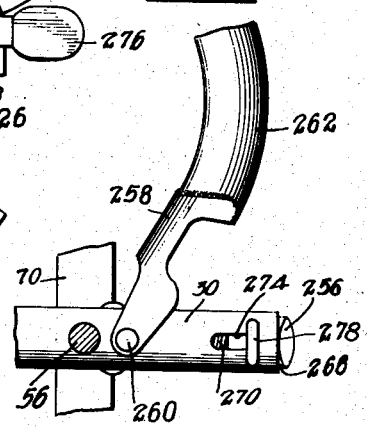
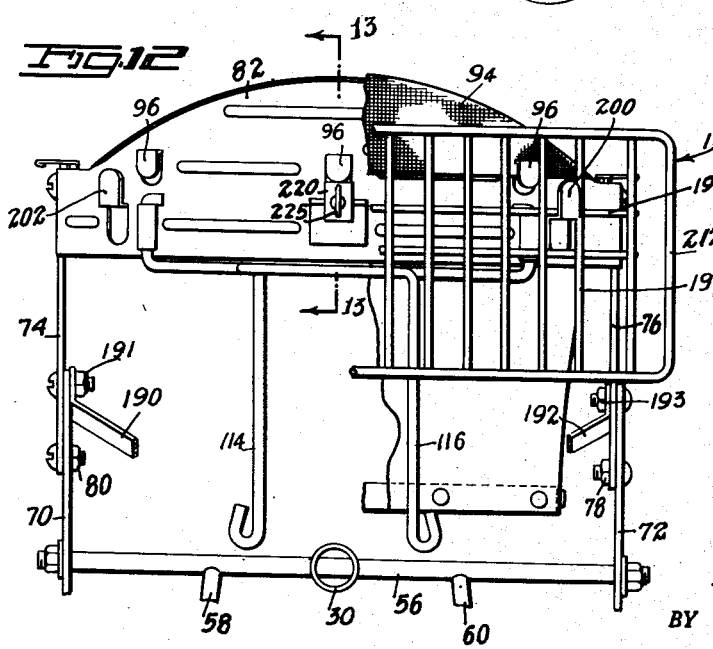
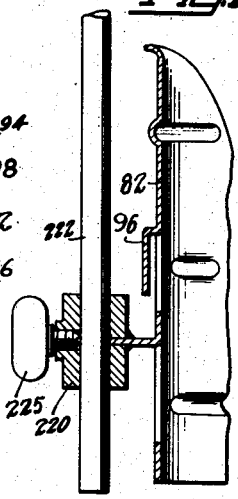
INVENTORS
SAMUEL M. SHONE
LEON PREISLER
BY
*Lyon & Lyon*
ATTORNEYS

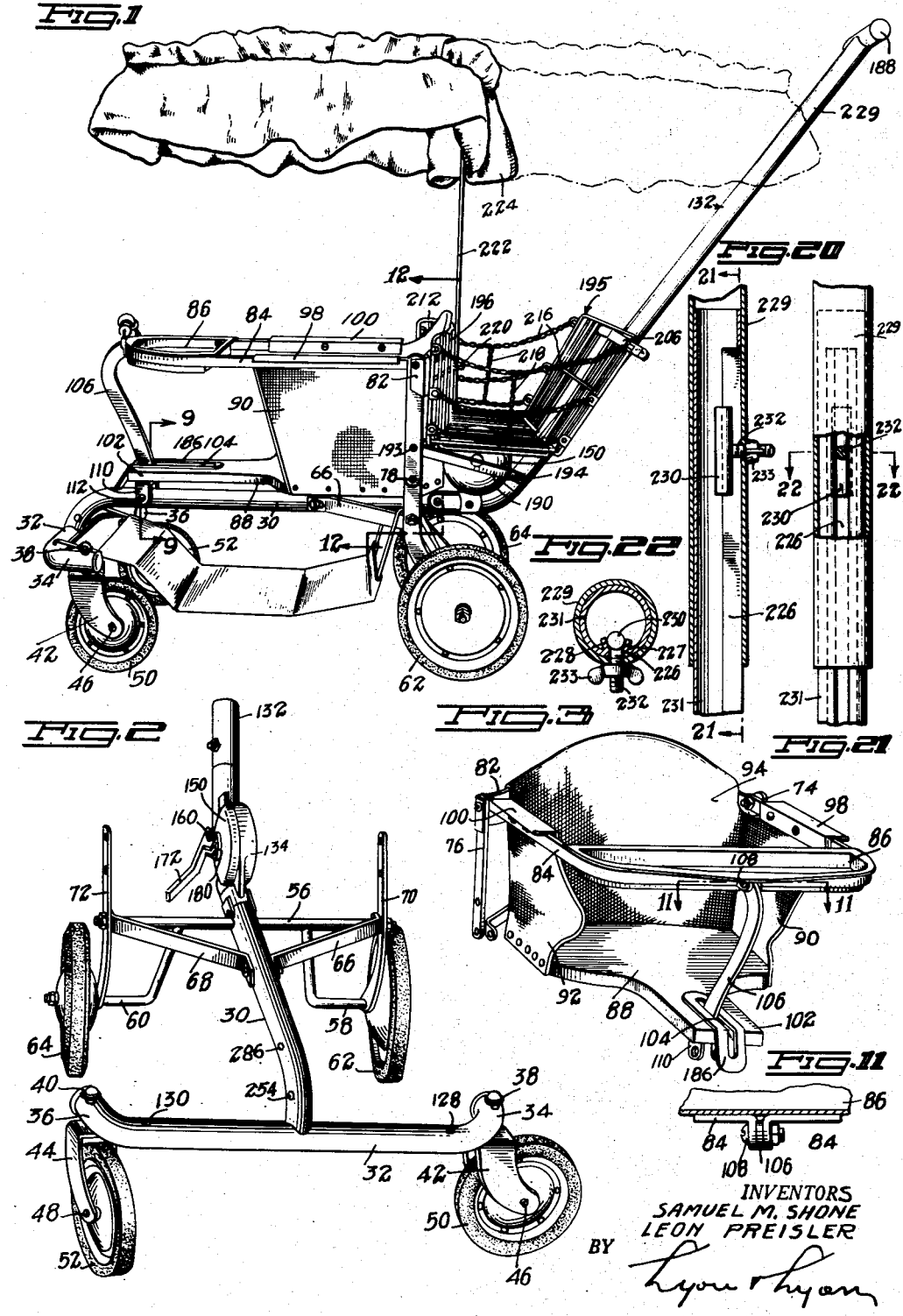

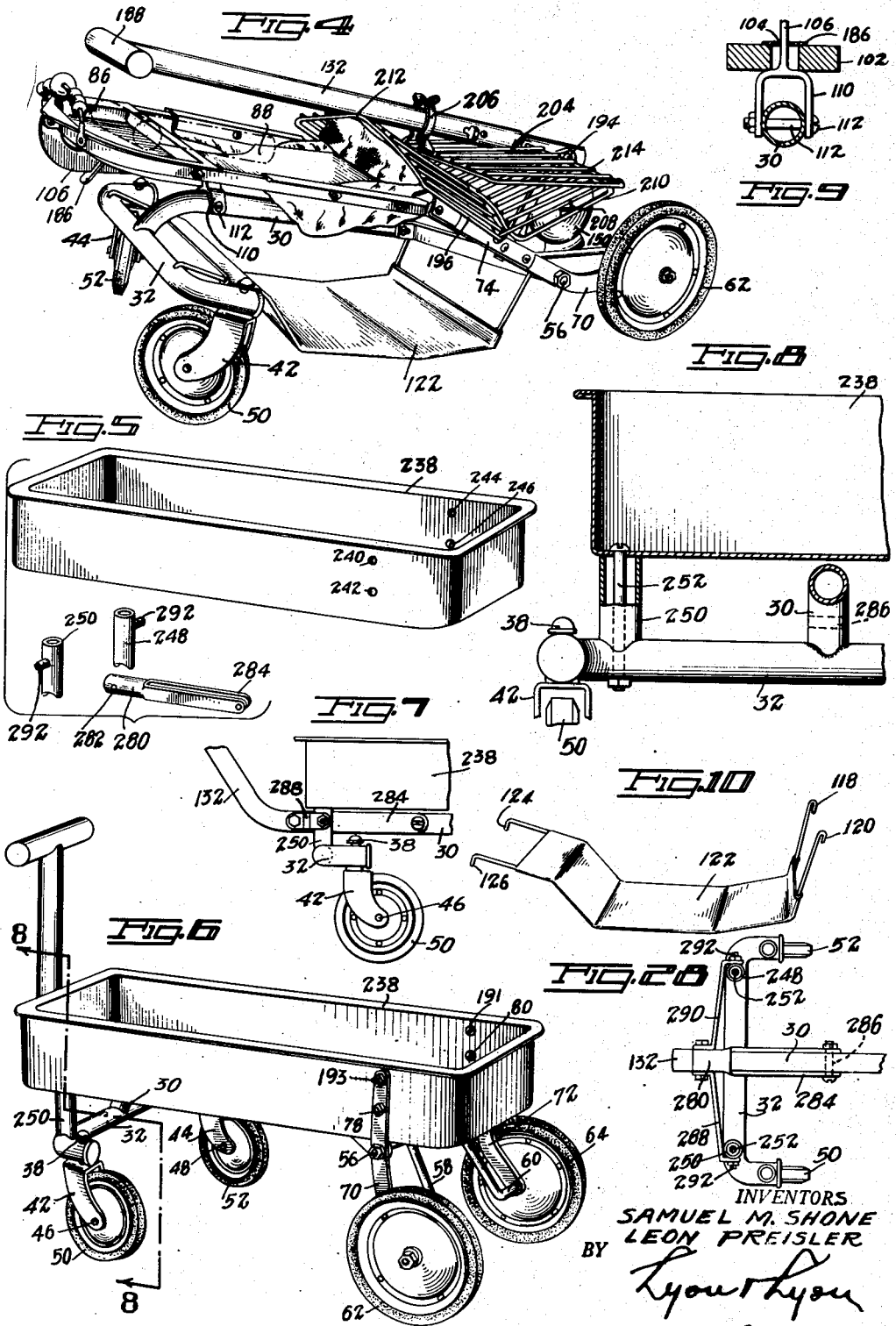

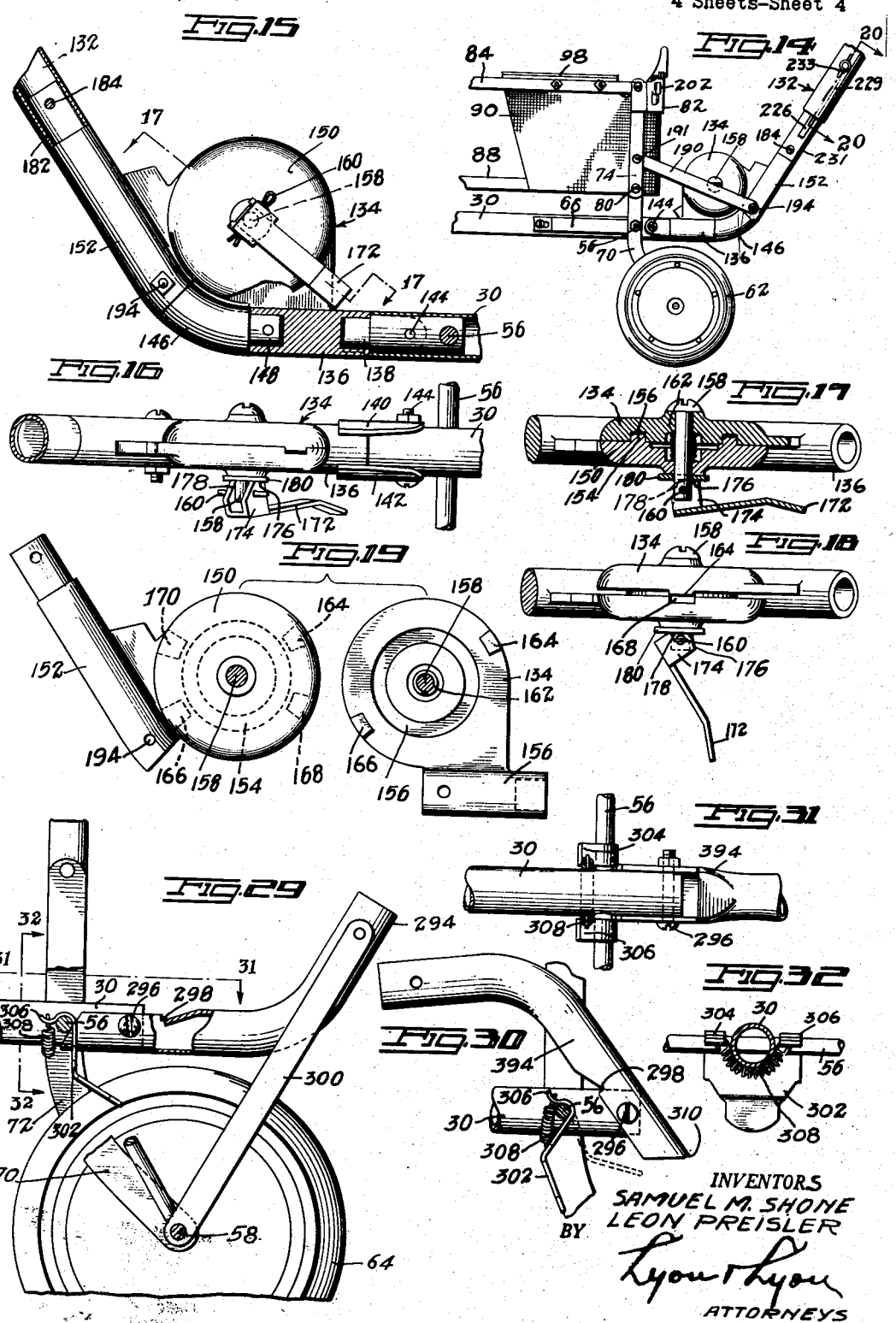

United States Patent Office 2,711,328
Patented June 21, 1955

2,711,328

FOLDING BABY STROLLER

Samuel M. Shone and Leon Preisler, Los Angeles, Calif., assignors to Strollee of California Inc., Los Angeles, Calif., a corporation of California Application June 12, 1952, Serial No. 293,108

6 Claims. (Cl. 280—41)

This invention relates to an improved baby stroller.

An object of this invention is to provide a folding baby stroller which is easily changed from the folded to the open position, or vice versa.

It is a further object of this invention to provide a baby stroller having a chassis readily adapted to receive a wagon body when the stroller seat is removed.

It is a still further object of this invention to provide collapsible carrying means on said stroller.

Still a further object of this invention is to provide a stroller having adjustable shade providing means.

Other objects and advantages will be readily apparent from the following description.

In the drawings:

Figure 1 is a perspective view of a stroller embodying this invention.

Figure 2 is a perspective view of the chassis.

Figure 3 is a perspective view of the seat assembly.

Figure 4 is a perspective view of the stroller in the folded position.

Figure 5 is a perspective view of the wagon body.

Figure 6 is a perspective view of the wagon body mounted upon the chassis.

Figure 7 is a fragmentary side elevation of the wagon mounted upon the chassis.

Figure 8 is a section taken along line 8—8 of Figure 6.

Figure 9 is a section taken along line 9—9 of Figure 1.

Figure 10 is a perspective view of the foot rest.

Figure 11 is a section taken along line 11—11 of Figure 3.

Figure 12 is a partial rear elevation partially in section taken along line 12—12 of Figure 1.

Figure 13 is a partial section taken along line 13—13 of Figure 12.

Figure 14 is a fragmentary side elevation of the stroller with the basket removed.

Figure 15 is an enlarged side elevation of the latch means.

Figure 16 is a top plan view of the latch means in the locked position.

Figure 17 is a section taken along line 17—17 of Figure 15.

Figure 18 is a top plan view of the latch means in the open position.

Figure 19 is a view of the halves of the latching means disassembled.

Figure 20 is a section taken along line 20—20 of Figure 14.

Figure 21 is a section taken along line 21—21 of Figure 20.

Figure 22 is a section taken along line 22—22 of Figure 21.

Figure 23 is a side elevation of a modification of this invention.

Figure 24 is a partial side elevation illustrating the latch means of the modification.

Figure 25 is a section taken along line 25—25 of Figure 24.

Figure 26 is a section taken along line 26—26 of Figure 25.

Figure 27 is a side elevation of the modified latch means in the open position.

Figure 28 is a fragmentary top plan view of the handle mounting illustrated in Figure 7.

Figure 29 is a fragmentary side elevation of another modified form of latch means.

Figure 30 is an enlarged fragmentary side elevation of the latch means of Figure 29.

Figure 31 is a section taken along line 31—31 of Figure 29.

Figure 32 is a section taken along line 32—32 of Figure 29.

Referring now to the drawings in detail wherein the preferred embodiment is illustrated, the chassis is best illustrated in Figure 2. The chassis is formed by a backbone 30 which curves downwardly at its front extremity and has suitably secured thereto a front wheel carrying bar 32. This bar 32 is curved rearwardly at each extremity 34 and 36 to eliminate sharp corners, a source of injury. The extremities 34 and 36 have respectively bolts 38 and 40 projecting through an aperture therein carrying wheel carrying brackets 42 and 44 which in turn mount axles 46 and 48 upon which are mounted rubber-tired wheels 50 and 52. Thus the wheels are rotatably mounted on the axles and pivotally secured to the bar 32.

The backbone 30 has a suitable aperture formed therein through which the rear wheel carrying bar 56 projects. Secured to the bar 56 are the rear axles 58 and 60 which project downwardly from bar 56 and then horizontally and have mounted adjacent their extremities rubber-tired rear wheels 62 and 64. Cross braces 66 and 68 are secured at one extremity to the backbone 30 and at the other extremity to one end of the bar 56 to strengthen the frame or chassis.

The axles 58 and 60 have respectively shoulders formed thereon inwardly of wheels 62 and 64 so that the lower extremities of the frame members 70 and 72, which have suitable apertures formed thereon adapted to fit onto the extremities of the axles but not to pass over the shoulders, are each clamped between a shoulder and a wheel when assembled. Suitable washers may be inserted between the wheels and the frame members to prevent interfernce with rotation of the wheels.

The frame members 70 and 72 also have apertures therein which receive an extremity of the bar 56. The bar has a shoulder formed thereon adjacent each extremity so that a cross brace 66 or 68 is first fitted onto the frame member 70 or 72. A suitable nut is then screwed onto the extremity of bar 56 looking the cross brace in place and the frame member in an upright position.

The stroller seat is best illustrated in Figures 1, 3 and 12. Seat braces 74 and 76 are adapted to be bolted onto the upper extremities of frame members 70 and 72 by bolts 78 and 80. Attached to the upper extremities of the braces 74 and 76 is a back rest. The back rest is curved rearwardly to provide comfort for the user (best seen in Figure 1) and has a curved upper edge to eliminate any sharp corners. Secured to the upper extremities of seat braces 74 and 76 by the same bolts that secure the back rest is a looped tray supporting ring 84 which has suitably mounted thereon a tray 86 of the conventional type.

The seat 88 is suspended from the back rest 82 and loop 84 by the cloth sides 90 and 92 and cloth back 94. The back 94 may be secured to the back rest in any suitable manner, such as by tabs 96. The sides 90 and 92 may be secured to loop 84 in any suitable manner such as by arm rests 98 and 100 which are bolted to the loop and clamp the cloth thereto.

The front of seat 88 is extended as at 102 and slotted as at 104 to permit passage of front brace 106 therethrough. The loop 84 is broken as seen in Figure 11, and the extremities are bent outwardly, the upper extremity of the front brace being clamped therebetween by bolt 108. The lower extremity of the brace 106 is forked as at 110, and a bolt 112 passes through each arm of the fork. A suitable aperture in backbone 30 secures the brace 106 thereto.

It is thus readily apparent that the seat may be removed from the chassis by removal of bolts 78, 80 and 112. Pivotally mounted to the back rest 82 are hooks 114 and 116 which pivot outwardly. These hooks transform the seat into a car seat when it is removed from the chassis.

Attached by suitable hooks 118 and 120 to the rear wheel carrying bar 56 is a foot rest 122 of conventional type. The foot rest has a pair of hooks 124 and 126 which project into suitable apertures 128 and 130 formed in the front wheel carrying bar 32 providing a front support for the foot rest.

Attached to the rear of the backbone 30 is a handle 132. The details of this attachment are best seen in Figures 14 through 19. One-half of the locking device 134 is formed on and carried by section 136. A plug 138 is retained in the extremity of backbone 30 by the shaft 56 which plug has an extremity fitting into a suitable recess in the section 136. A pair of opposed plates 140 and 142 are welded onto the section 136 and project beyond the extremity thereof. A bolt 144 projects through apertures in plate 140, backbone 30, plug 138 and plate 142 securing the half locking device 134 to the extremity of the backbone. A spacing member 146 has a stud 148 formed thereon which fits into a suitable recess in section 136 and is bolted thereto. The size and curvature of this spacing member 146 controls the position of the handle 132 as will hereafter be apparent.

A second half 150 of the locking device is formed on or secured to pipe section 152. This half lock 150 has an annular ridge 154 adapted to fit into the groove 156 formed in the half lock 134 to center the two halves. A bolt 158 projects through the two halves and cotter pin 160 holds the half locks together against the pressure of spring 162.

The half lock 134 is provided with a pair of opposed teeth 164 and 166, and half lock 150 is provided with a pair of opposed teeth receiving recesses 168 and 170. The two half locks are urged away from one another by spring 162 a sufficient distance to permit half lock 150 to rotate with respect to half lock 134. A lever 172 has a forked extremity 174 which is secured by cotter pin 160 to bolt 158. The extremity 174 has a peak 176 formed on each fork and a flat slanting portion 178 adjacent the peak. When the lever 172 is pivoted outwarldy as seen in Figure 18, the portion 178 bears against flange 180 and the spring urges the half locks apart. The half lock 150 is then rotated either to the forward or the rear position wherein the teeth 164 and 166 fit into the recesses 168 and 170. The lever is then pivoted inwardly as seen in Figure 17 so that peak 176 bears against flange 180 camming the flange and hence half lock 150 inwardly toward half lock 134, thereby locking the half lock 150 against further rotation due to the intermeshing of the teeth and recesses.

As seen in Figures 1 and 15, the half locks are meshed in the rear position. Section 152 has a stud 182 formed thereon which fits into the extremity of handle 132. The handle is secured into position by a bolt 184, and hence forward or rearward movement of the handle is transmitted to the half lock 150. It is readily apparent that the positioning of the teeth 164 and 166 and recesses 168 and 170 determines the forward and rearward positions of the handle 132.

Referring now to Figure 4, the stroller is illustrated as partially folded. The lock has ben released by outwardly pivoting lever 172, and handle 132 is rotated forward. The frame members 70 and 72 pivot on the rear wheel carrying bar 56 carrying the braces 74 and 76 forward and downward through an arc. The front brace 106 pivots through an arc forwardly and downwardly carrying tray 86 to a position slightly forward of the front wheels. It is preferred to provide a metal plate 186 lining slot 104 and projecting forwardly and downwardly from the extension 102 of seat 88. This plate 186 acts as a guide and a limit for movement of the brace 106 and prevents wear on seat 88. When brace 106 has pivoted forward sufficiently far to contact the extremity of the slot in the metal plate, it forces the seat 88 forward and down against backbone 30 limiting further movement. It is desirable to position the teeth 164 and 166 and slots 168 and 170 so that the hand grip 188 lies in the tray 86 (as seen in phantom in Figure 4) at the forward position to minimize the space occupied. The lever 172 is then pivoted inwardly locking the half locks 134 and 150 together, thus preventing rotation of handle 132. This provides a small compact bundle which can be carried around by handle 132.

A pair of cross braces 190 and 192 are provided, bolted as at 191 and 193 at one extremity to the upper extremity of frame members 70 and 72 respectively, and to the midportion of braces 74 and 76, respectively (see Figure 12). The other extremity of these cross braces is bolted by bolt 194 to handle 132. The position of bolt 194 is preferably well below that of bolt 158. This carries the cross braces 190 and 192 below bolt 158 and hence below the center of rotation of handle 132. Thus when the handle is at its rear position, as seen in Figure 1, the cross braces lock the handle in this position, and the addition of weight to the front of the stroller will not rotate handle 132 and hence collapse the stroller in the event the user forgets to pivot lever 172 and lock the half locks 134 and 150 together.

It is to be noted in Figure 1 that the rear wheels 62 and 64 are mounted well behind the seat 88. This is to lower the center of gravity and lessen the tendency to tip over when considerable weight is carried in the basket 195. This basket is formed by a ribbed front section 196 which is curved to the contour of the back rest 82 to add to the comfort of the occupant. The front section is mounted on the back rest by a cross bar 198 which is supported by hooks 200 and 202 formed integrally with the back rest. The back ribbed section 204 has a forked clip 206 which is welded to a pair of the ribs and is adapted to fit about and grasp handle 132. A ribbed base 208 has two of the ribs extending beyond the frame 210 thereof and hooking over the frame 212 of the front section 196 and welded thereto and hooking around the frame 214 of the rear section 204 forming a pivotal connection therewith. The sides are formed by a plurality of chains 216, or similar foldable members, which may be joined together in their midsections by vertically extending chains 218, thus forming a basket which may be folded with the stroller and eliminating the necessity of removing the basket prior to folding the stroller.

Attached to the back rest 82 is a stud 220 having an aperture therein adapted to receive the stem 222 of parasol 224 (best seen in Figure 13). A screw 225 screws into said stud locking the parasol in any desired position. The parasol may be raised or lowered or rotated to shield the occupant from the sun, or it may be removed entirely.

Referring now to Figures 20 through 22, means are illustrated to permit adjustment of the hand grip 188 with respect to the stroller. The lower handle segment 231 has a slot 226 formed therein having internal flanges 227 and 228 projecting into said handle and slanting away from one another. The upper hand grip carrying member 229 telescopically receives the upper extremity of the lower handle segment 231. A rod 230 is positioned between the diverging flanges 227 and 228. A bolt 232 is secured to said rod 230 projecting through a suitable aperture in said member 229 and through slot 226. Thus when the wing nut 233 is tightened, it draws the rod 230 towards the member 229. This forces the flanges 227 and 228 apart, clamping the member 229 to segment 231. When nut 233 is loosened, the member 229 is adjustable with respect to segment 231.

When the seat has been removed from the chassis by removal of bolts 78, 80, 112, 191 and 193, the chassis is adapted to readily receive wagon body 238. Suitable apertures 240, 242, 244 and 246 are provided at the rear of the wagon body through which bolts 191, 80, 193 and 78 project respectively, securing the rear of the wagon to the frame members 70 and 72. A pair of spacers 248 and 250 are provided between the front of the wagon and the bar 32 to adjust the height of the front end and make the body level, and suitable bolts such as 252 secure the front end of the wagon body 238 to the bar 32. Thus when the child outgrows the stroller, the device is easily converted to a wagon. It is desirable to have the handle 132 at the front extremity of the wagon, that is, at the end bearing the pivotally mounted wheels 50 and 52. For this conversion the bolt 144 is removed and the cross braces 190 and 192 are removed. This frees the handle and whole lock assembly from the chassis. After the handle 132 has been removed in this manner, bolt 184 is removed and the handle released from the latch means.

Referring now to Figures 6, 7 and 28, the mounting of the handle to the front of the wagon is illustrated. A sleeve 280 is provided to telescopically receive the extremity of the handle 132, and a suitable bolt projects through an aperture 282 in the sleeve and through handle 132 bolting same to the sleeve. At the opposite extremity the sleeve is provided with a fork 284 which fits onto the backbone 30, and a suitable bolt projects through both legs of fork 284 and through an aperture 286 in the backbone 30 bolting the sleeve and handle to the backbone. Braces 288 and 290 are secured at one extremity to sleeve 280 by the same bolt that secures the handle 132 to the sleeve. These braces are secured at their opposite extremities to the spacers 250 and 248, respectively, which spacers are provided with threaded studs such as 292 for this purpose.

Refering now to Figures 23 through 27, a modified form of the handle locking means is illustrated. In this embodiment the backbone 30 terminates at 256. A yoke 258 is pivotally connected at one extremity by pin 260 to the backbone. At the other extremity of the yoke a curved handle supporting section 262 is secured and handle 132 is forked at its extremity 264 and secured by bolt 266 to the section 262. The backbone 30 is slotted on each side as at 272 and 274 and screws 276 and 278 are carried by plug 268 thereby limiting its movement outwardly. When the handle 132 and section 262 are pivoted rearwardly, as seen in Figure 24, the spring 270 urges the plug 268 rearwardly and partially into the extremity of the section 262 locking the handle into the rearward position. When the screws 276 and 278 are grasped and moved forward, the plug 268 is withdrawn into the backbone releasing section 262 and permitting it to pivot forwardly. When the seat is removed and the wagon body 238 mounted upon the chassis, the bolt 266 is removed and the handle 132 moved to the front of the wagon and bolted by bolt 266 through aperture 254 to the backbone.

Referring now to Figures 29 through 32, a further modified form of latch is illustrated. In this embodiment the handle 132 is bolted onto the upper extremity of curved latch member 294 in the usual manner hereinbefore described. The curved latch member at its opposite extremity has a section removed from the upper surface thereof so that it receives and partially surrounds the extremity of backbone 30. A bolt 296 secures curved latch member 294 thereto permitting pivoting of the latch member on the backbone 30. A notch such as 298 may be cut in the latch member 294 near the extremity of backbone 30 to avoid interference therewith upon pivoting of the handle to the position seen in Figure 30. A pair of links such as 300 are secured at one extremity to the latch member 294 and one to each rear axle 58 and 60 so that pivoting of the handle 132 causes the stroller to collapse as in each of the previous embodiments.

A tongue or latch 302 has at its upper extremity a pair of ears 304 and 306 which are spaced from one another and pivotally mount the tongue on the bar 56, one on each side of the backbone 30. A spring 308 is attached at each extremity to the ears 304 and 306, respectively, and passes beneath the backbone 30 urging the tongue to pivot to the dotted line position seen in Figure 30. The tongue is provided with a recess between ears 304 and 306 slightly larger than the contour of backbone 30 to permit this pivoting action. When the handle 132 is pivoted from the position illustrated in Figure 30 to the position illustrated in Figure 29, the end 310 of the sleeve-like extremity strikes the tongue 302 and cams it to the rearward, illustrated by the full lines in Figure 30. The end 310 then passes between the tongue 302 and the backbone 30 into the recess formed between ears 304 and 306. The spring 308 then pivots the tongue 302 to the position seen in Figure 29, locking the curved latch member 294 to the backbone 30 and preventing pivoting of the handle 132. When it is desired to pivot the handle 132, the tongue 302 is manually urged to the rear position seen in Figure 30 until it passes beyond end 310 freeing the curved latch member 294 and permitting pivoting of the handle 132 and collapsing of the stroller.

While what hereinbefore has been described is the preferred embodiment of this invention, it is readily apparent that alterations and modifications can be resorted to without departing from the scope of this invention, which alterations and modifications are intended to be included within the scope of the appended claims.

We claim:

1. A folding stroller comprising: a backbone, a pair of front wheels carried at the front of said backbone, a cross rod adjacent the rear of said backbone, a pair of axles mounted upon said cross rod, a pair of frame members each connected to an extremity of said cross rod and to an axle, a rear wheel mounted upon each of said axles, a handle pivotally mounted to said backbone to the rear of said rear wheels, cross brace means connecting said handle to said rear wheel mounting so that pivoting of said handle towards said front wheels pivots said rear wheels rearwardly, a seat supporting ring mounted upon said frame members, a seat suspended therefrom by fabric sides and a fabric back rest, a front brace pivotally mounted upon said backbone and attached to the forward portion of said seat supporting ring, a basket having a front section releasably supported by said seat supporting ring, a rear section releasably supported by said handle, a base section carried by said front and rear sections, and sides formed by chains linked between said front and rear sections to permit said basket to be folded with said stroller when said handle is pivoted.

2. A folding stroller comprising: a backbone, a pair of front wheels carried at the front of said backbone, a cross rod adjacent the rear of said backbone, a pair of axles mounted upon said cross rod, a pair of frame members each connected to an extremity of said cross rod and to an axle, a rear wheel mounted upon each of said axles, a handle pivotally mounted to said backbone to the rear of said rear wheels, cross brace means connecting said handle to said rear wheel mounting so that pivoting of said handle towards said front wheels pivots said rear wheels rearwardly, a seat supporting ring mounted upon said frame members, a seat suspended therefrom by fabric sides and a fabric back rest, a front brace pivotally mounted upon said backbone and attached to the forward portion of said seat supporting ring, latch means between said handle and the extremity of said backbone to secure the handle in its rearmost position, a basket having a front section releasably supported by said seat supporting ring, a rear section releasably supported by said handle, a base section carried by said front and rear sections, and sides formed by chains linked between said front and rear sections to permit said basket to be folded with said stroller when said handle is pivoted.

3. A folding stroller comprising: a backbone, a pair of front wheels carried at the front of said backbone, a cross rod adjacent the rear of said backbone, a pair of axles mounted upon said cross rod, a pair of frame members each connected to an extremity of said cross rod and to an axle, a rear wheel mounted upon each of said axles, a handle pivotally mounted to said backbone to the rear of said rear wheels, cross brace means connecting said handle to said rear wheel mounting so that pivoting of said handle towards said front wheels pivots said rear wheels rearwardly, a seat supporting ring mounted upon said frame members, a seat suspended therefrom by fabric sides and a fabric back rest, a front brace pivotally mounted upon said backbone and attached to the forward portion of said seat supporting ring, said rear wheels in the operative position being positioned behind the upper extremities of said frame members, a basket having a front section releasably supported by said seat supporting ring, a rear section releasably supported by said handle, a base section carried by said front and rear sections, and sides formed by chains linked between said front and rear sections to permit said basket to be folded with said stroller when said handle is pivoted.

4. In a folding stroller of the type having a backbone and a handle pivotally mounted upon such backbone so that pivoting of said handle controls the folding and unfolding of said stroller, the combination with said backbone and handle of: a curved latch member secured to said handle at one extremity to receive the extremity of said backbone, a cross bar projecting through said backbone, a tongue, a pair of ears on said tongue engaging said cross bar one on each side of said backbone thereby suspending said tongue from said cross bar, and a spring joining said ears and passing beneath said backbone, said tongue having a cutaway portion adjacent said backbone to receive the extremity of said curved latch member and to clamp said latch member between said tongue and said backbone.

5. A folding stroller comprising: a backbone, a pair of front wheels carried at the front of said backbone, a pair of rear wheels pivotally mounted upon said backbone, a handle pivotally mounted to said backbone to the rear of the rear wheels, cross brace means connecting said handle to said rear wheel mounting so that pivoting of said handle toward said front wheels pivots said rear wheels rearwardly with respect to said front wheels, a curved latch member secured to said handle at one extremity and cut away at the other extremity to receive the extremity of said backbone, a cross bar projecting through said backbone, tongue means pivotally mounted upon said cross bar, and spring means urging said tongue means to pivot towards the extremity of said backbone, said tongue means being cut away to receive the extremity of said curved latch member and to clamp same between said backbone and said tongue.

6. A folding stroller comprising: a backbone, a pair of front wheels carried at the front of said backbone, a pair of rear wheels pivotally mounted upon said backbone, a handle pivotally mounted to said backbone to the rear of the rear wheels, cross brace means connecting said handle to said rear wheel mounting so that pivoting of said handle toward said front wheels pivots said rear wheels rearwardly with respect to said front wheels, a curved latch member secured to said handle at one extremity to receive the extremity of said backbone, a cross bar projecting through said backbone, a tongue, a pair of ears on said tongue engaging said cross bar one on each side of said backbone thereby suspending said tongue from said cross bar, and a spring joining said ears and passing beneath said backbone, said tongue having a cutaway portion adjacent said backbone to receive the extremity of said curved latch member and to clamp said latch member between said tongue and said backbone.

References Cited in the file of this patent
UNITED STATES PATENTS

| | | |
|---|---|---|
| 1,850,406 | Mayer | Mar. 22, 1932 |
| 2,241,799 | Welsh | May 13, 1941 |
| 2,401,342 | Eckhardt | June 4, 1946 |
| 2,455,168 | Gilmore | Nov. 30, 1948 |
| 2,576,356 | Peterson | Nov. 27, 1951 |